United States Patent
Mandal et al.

(10) Patent No.: US 11,736,450 B2
(45) Date of Patent: Aug. 22, 2023

(54) ANONYMOUS MESSAGE BOARD

(71) Applicant: FUJITSU LIMITED, Kawasaki (JP)

(72) Inventors: Avradip Mandal, San Jose, CA (US); Hart Montgomery, Redwood City, CA (US); Arnab Roy, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 17/398,704

(22) Filed: Aug. 10, 2021

(65) Prior Publication Data

US 2023/0049001 A1 Feb. 16, 2023

(51) Int. Cl.
*H04L 9/40* (2022.01)
*H04L 9/00* (2022.01)
*H04L 9/08* (2006.01)

(52) U.S. Cl.
CPC ...... *H04L 63/0421* (2013.01); *H04L 63/0435* (2013.01); *H04L 63/068* (2013.01); *H04L 9/008* (2013.01)

(58) Field of Classification Search
CPC .......... H04L 63/0421; H04L 63/0435; H04L 63/068; H04L 9/008; H04L 63/0442; H04L 9/085; H04L 9/0891
See application file for complete search history.

(56) References Cited

U.S. PATENT DOCUMENTS

| | | | |
|---|---|---|---|
| 2006/0085651 A1* | 4/2006 | Staddon | H04L 9/3218 713/193 |
| 2007/0242829 A1* | 10/2007 | Pedlow | H04N 21/26606 380/277 |
| 2008/0275956 A1* | 11/2008 | Saxena | G06F 16/2358 709/206 |
| 2016/0294836 A1* | 10/2016 | Williams | H04L 63/0421 |
| 2021/0144002 A1* | 5/2021 | Aronesty | H04L 9/3239 |
| 2022/0094526 A1* | 3/2022 | Irazabal | H04L 9/3239 |

OTHER PUBLICATIONS

Anonymous Multireceiver Identity-Based Encryption, by Ho et al., published Sep. 2010 (Year: 2010).*
Control Cloud Data Access Privilege and Anonymity With Fully Anonymous Attribute-Based Encryption, by Li et al., published Jan. 2015 (Year: 2015).*

(Continued)

*Primary Examiner* — Vu V Tran
(74) *Attorney, Agent, or Firm* — Maschoff Brennan (57) ABSTRACT

A method of facilitating an anonymous message board may include receiving a secret key share associated with a published public key. An initial table state may be generated by encrypting, via the public key, an initial table including a table index and table initial values. A user post encrypted via the public key may be received, the user post including a message and a message index value. The initial table state may be updated to an updated table state by replacing an initial table value of the initial table values with the message. In response to a time interval associated with a predetermined length of time expiring after generating the initial table state, the updated table state may be partially decrypted via the first secret key share as a partially decrypted table. The partially decrypted table may be broadcast.

18 Claims, 4 Drawing Sheets

(56) References Cited

OTHER PUBLICATIONS

[Riposte] Corrigan-Gibbs, Henry, Dan Boneh, and David Mazières. "Riposte: An anonymous messaging system handling millions of users." 2015 IEEE Symposium on Security and Privacy. IEEE, Mar. 20, 2015.
[Threshold-FHE] Boneh, Dan, Rosario Gennaro, Steven Goldfeder, Aayush Jain, Sam Kim, Peter MR Rasmussen, and Amit Sahai. "Threshold cryptosystems from threshold fully homomorphic encryption." In Annual International Cryptology Conference, pp. 565-596. Springer, Cham, Jul. 25, 2018.
Cheng, Raymond, et al. "Talek: Private Group Messaging with Hidden Access Patterns." arXiv preprint arXiv:2001.08250 (Jan. 22, 2020).
[Pung] Angel, Sebastian, and Srinath Setty. "Unobservable communication over fully untrusted infrastructure." 12th {USENIX} Symposium on Operating Systems Design and Implementation ({OSDI} 16). Nov. 2, 2016.
Islam, Nazmul, Kazi Md Rokibul Alam, and Ashiqur Rahman. "The effectiveness of mixnets—an empirical study." Computer Fraud & Security Dec. 2013 (Dec. 2013): 9-14.
Tyagi, Nirvan, et al. "Stadium: A distributed metadata-private messaging system." Proceedings of the 26th Symposium on Operating Systems Principles. Oct. 2017.
Kwon, Albert, et al. "Atom: Horizontally scaling strong anonymity." Proceedings of the 26th Symposium on Operating Systems Principles. Oct. 7, 2017.

* cited by examiner

ANONYMOUS MESSAGE BOARD

BACKGROUND

Blockchains may generally pseudonymize all users, which does not imply privacy for the users. Blockchain traffic analysis may provide clues sufficient to compromise user identities, transaction details, and the like.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment a method of facilitating an anonymous message board may include receiving a secret key share associated with a published public key. An initial table state may be generated by encrypting, via the public key, an initial table including a table index and table initial values. A user post encrypted via the public key may be received, the user post including a message and a message index value. The initial table state may be updated to an updated table state by replacing an initial table value of the initial table values with the message. In response to a time interval associated with a predetermined length of time expiring after generating the initial table state, the updated table state may be partially decrypted via the first secret key share as a partially decrypted table. The partially decrypted table may be broadcast.

The object and advantages of the embodiments will be realized and achieved at least by the elements, features, and combinations particularly pointed out in the claims.

It is to be understood that both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings.

DESCRIPTION OF EMBODIMENTS

Highly sensitive transactions may be susceptible to traffic analysis attacks on some conventional blockchain systems. For instance, a whistleblower may wish to expose some activity of an entity in a manner that is not traceable to the whistleblower because the whistleblower may risk sever retaliation if identified.

An anonymous message board may facilitate postings of messages, hashes, encryptions, proofs of settlement, transactions, and the like, which may be described generally herein as messages. The transactions may be posted to the message board in a manner that may not allow an observer to trace the transaction back to the poster. One approach may include releasing all transactions submitted during a defined time interval at the same time following expiration of the time interval.

A server managing the message board may determine whether an entity submitted a transaction during the time interval but may not determine which users submitted which transactions. In some configurations, message board participants may be encouraged to submit null transactions to facilitate anonymity of participants submitting non-null transactions. However, conventional anonymous message broadcast systems may cease to function if any of the associated servers stop working or otherwise stop participating in the management of the anonymous message broadcast system.

Some embodiments include a robust anonymous message board that may continue to function despite associated servers ceasing to participate in the management of the robust anonymous message board. In some embodiments, the robust anonymous message board may continue to function so long as a set of servers belonging to a permitted access structure remain functional. Privacy may be preserved so long as colluding servers do not make up the permitted access structure. Furthermore, the anonymous message board may not be susceptible to denial of service attacks by malicious clients. Clients, or users, of the anonymous message board may broadcast their messages and thus may not send individual messages to each server.

In some embodiments, the anonymous message board may be blockchain-based. For example, blockchains may be resilient to compromise by a constant fraction of consensus participants and such a security property may be exploited in a security proof of the anonymous message board. Users may send messages to the anonymous message board, including null messages. The messages from the users may be compiled in an encrypted state. For example, Fully Homomorphic Encryption (FHE) may be employed. At the end of a particular time interval, all messages may be released and decrypted together. Thus, for example, an adversary may be able to determine a set of messages submitted during the time interval and a set of senders of the messages submitted during the time interval but the adversary may not be able to determine which senders are responsible for which messages.

In some embodiments, the anonymous message board may remain secure and private when a supermajority (e.g., two-thirds) or some other portion of the servers managing the anonymous message board are honest. The anonymous message board may be employed for numerous applications where privacy may be desired or required by law. For instance, private financial transactions and settlements, whistleblowing disclosures, medical record updates, anonymous auctions, anonymous voting, and the like may benefit from an anonymous message board. Some transactions, such as anonymous voting may further employ zero knowledge proofs indicating eligibility and/or uniqueness of the transactions.

Conventional FHE can perform functional evaluations over the ciphertext space. For instance, encrypted data subjected to some operation may maintain correctness when decrypted. Conventional FHE may employ functions as follows:

$FHE.KeyGen(\ ) \rightarrow pk, sk$ $FHE.Enc(pk, m) \rightarrow c$ $FHE.Eval(pk, f, c) \rightarrow c'$ $FHE.Dec(sk, c') \rightarrow f(m)$ Where pk represents a public key, sk represents a secret key, m represents a message, f represents a function or operation performed to data, c represents the message m encrypted via the public key pk, and c' represents the ciphertext message c evaluated via the operation f.

Conventional threshold FHE (TFHE) divides the secret key among multiple parties. Decryption succeeds only if a threshold number of parties belonging to an access structure collaborate among themselves. Conventional TFHE may employ functions as follows:

TFHE.KeyGen$(A) \rightarrow pk, sk_1, \ldots, sk_n$

TFHE.Enc$(pk,m) \rightarrow c$

TFHE.Eval$(f,c) \rightarrow c'$

TFHE.PartDec$(sk_i, c') \rightarrow x_i$

TFHE.FinalDec$(pk, \{x_{i_1}, \ldots, x_{i_1}\}) \rightarrow m'$

Where A represents an access structure, pk represents a public key, sk represents a secret key, m represents a message, f represents a function or operation performed to data, c represents the message m encrypted via the public key pk, c' represents the encrypted message c evaluated via the operation f $x_i$ represents a partial decryption of c' via the secret key i $sk_i$, and m' is the final decryption of the set of partial decryptions $\{i_1, \ldots, i_k\}$. If $\{i_1, \ldots, i_k\}$ is part of the access structure A, then m'=f(m).

Embodiments will be explained with reference to the accompanying drawings.

Figure 1A:
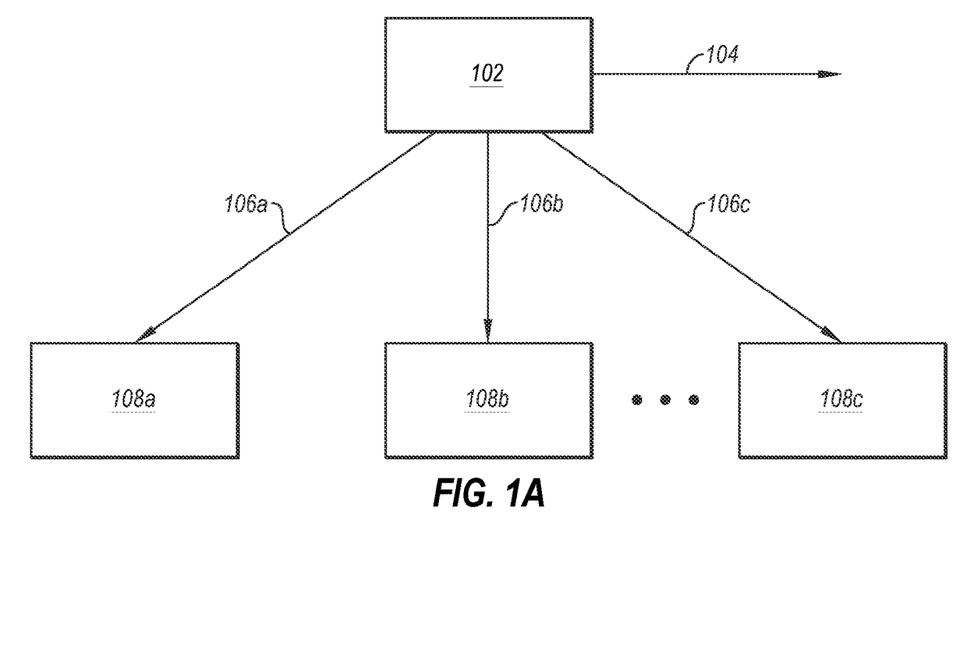
FIGS. 1A-1C illustrate diagrams of example interactions between entities in generation of an anonymous message board.
Figure 1B:
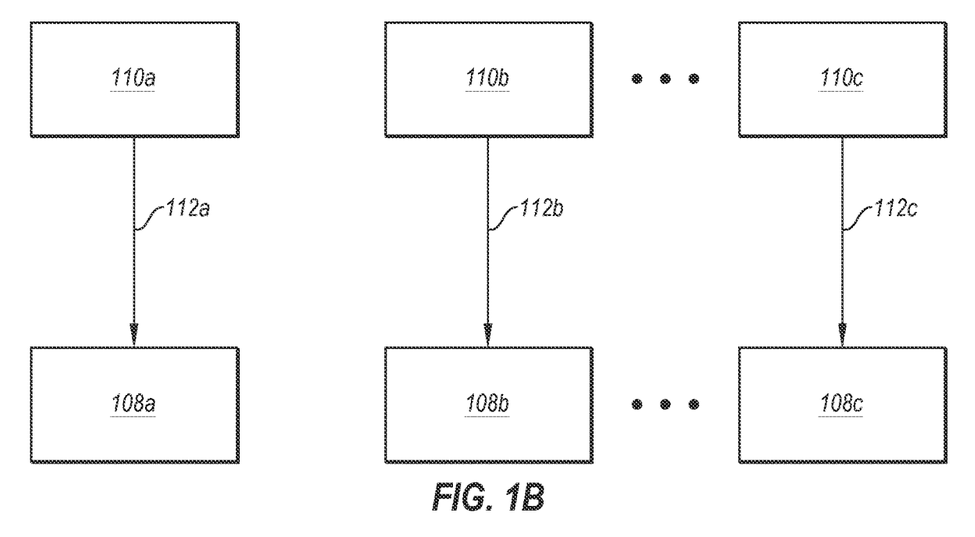
Figure 1C:
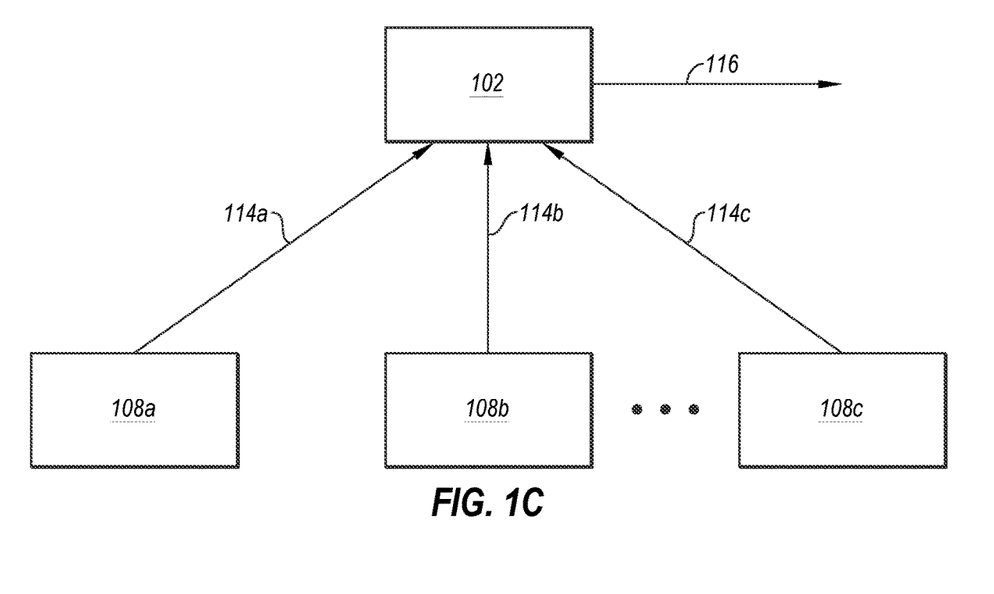

FIGS. 1A-1C illustrate diagrams of example interactions between entities in generation of an anonymous message board. In some embodiments, an anonymous message board (AMB) scheme may include the following algorithms.

AMB.KeyGen$(\lambda, n, A) \rightarrow (pk, \langle sk_i \rangle_{i=1}^n)$

AMB.Post$(pk, msg, ind) \rightarrow y$

AMB.ServerInit$(sk_i, k) \rightarrow \sigma_0$

AMB.ServerUpdate$(sk_i, \sigma) \rightarrow \sigma'$

AMB.Reveal$(sk_i, \sigma) \rightarrow D_i$

AMB.Combine$(pk, \langle D_i \rangle) \rightarrow D$

Where $\lambda$ represents a security parameter, A represents an access structure, n represents a number of participating servers, pk represents a public key, $sk_i$ represents an i-th secret key share of a secret key sk, msg represents a message, ind represents a message index value, y represents a user post, which is not in the clear, k represents a table size, $\sigma_0$ represents an initial table state, $\sigma$ represents a table state, $\sigma'$ represents an updated table state, $D_i$ represents an i-th partially decrypted table, $\langle D_i \rangle$ represents a collection of partially decrypted tables that satisfies an access structure, and D represents a decrypted table. The anonymous message board may include the decrypted table D.

With reference to FIG. 1A, in some configurations, a master authority 102 may generate n secret key shares $sk_i$ 106a-106c (collectively, secret key shares $sk_i$ 106) and the public key pk 104 according to the access structure A and the security parameter $\lambda$. In some configurations, the master authority 102 may include a distributed multiparty computation. Each of the secret key shares $sk_i$ 106 may be provided to a different one of the n servers 108a-108c (collectively, n servers 108) participating in the access structure A for the anonymous message board. The public key pk 104 may be published such that it is publicly available to users of the anonymous message board.

Each of the n servers 108 may initialize a k-length table having a table index and corresponding initial table values such as 0. The table may be encrypted via the public key pk 104 such that the elements of the table, a user message msg, and a user message index value ind may be collectively subjected to FHE evaluations. Thus, for example, the table state $\sigma$ may equal an initial table state $\sigma_0$.

With reference to FIG. 1B, users 110a-110c (collectively, users 110) may generate user posts y 112a-112c (collectively, user posts y 112), each of which may be encrypted via the public key pk 104 and includes a corresponding message msg and message index value ind. The user posts y 112 may be broadcast to the n servers 108.

Each of the n servers 108 may receive the user posts y 112 and may update its corresponding table state $\sigma$ to reflect the user posts y 112. For example, for a given user post y 112a, the encrypted values of the table index may be compared to the encrypted message index value ind and where the index values match, the corresponding initial table value may be replaced by the encrypted message msg. Thus, for example, the table state $\sigma$ may be an updated table state $\sigma'$.

The n servers 108 may repeat the server update process for a specified interval of time. For example, the n servers 108 may incorporate each of the user posts y 112 received during the interval of time into the table state a such that the table state $\sigma$ is repeatedly updated. By way of example, the server update process may repeat for each of the user posts y 112 received from the time the server initializes the table until a predetermined length of time expires.

With reference to FIG. 1C, after the length of time expires, each of the n servers 108 may reveal the table state $\sigma$ by partially decrypting the table state $\sigma$ via the secret key shares $sk_1$ 106 associated with the individual server. Each of the n servers 108 may further broadcast its partially decrypted table $D_i$ 114a-114c (collectively, partially decrypted tables The partially decrypted tables $D_i$ 114 may be collected. In response to collecting enough partially decrypted tables $D_i$ 114 to satisfy a decryption threshold related to a certain number of secret key shares $sk_i$ 106, for instance, enough partially decrypted tables $D_i$ 114 may be collected to satisfy the access structure A, a decrypted table D 116 may be combined based on the public key pk 104 and published. In some embodiments, the published table D 116 may include a group of messages that were posted during the corresponding time interval and that may accordingly be published together.

In some embodiments, a basic construction of the anonymous message board scheme may include the following functions.

AMB.KeyGen$(\lambda, n, A)$: TFHE.KeyGen$(\lambda, n, A) \rightarrow (pk, \langle sk_i \rangle_{i=1}^n)$ AMB.Post$(pk, msg, ind)$: TFHE.Enc$(pk, (ind, msg)) \rightarrow y$ AMB.ServerInit$(sk_i, k)$: TFHE.Enc$(pk, (j, 0))$ for $j \in [1, k] \rightarrow \langle ctrec_j \rangle_{j=1}^k = \sigma_0$ AMB.ServerUpdate$(sk_i, \sigma)$:

TFHE.Eval$(pk, P(y, ctrec_j))$ for $j \in [1, k] \rightarrow \langle ctrec'_j \rangle_{j=1}^k = \sigma'$ AMB.Reveal$(sk_i, \sigma)$: TFHE.PartDec$(sk_i, \sigma) \rightarrow D_i$ AMB.Combine$(pk, \langle D_I \rangle)$: TFHE.Final Dec$(pk, D'_I) \rightarrow D'$ Where λ represents a security parameter, A represents an access structure, n represents a number of participating servers, pk represents a public key, $sk_i$ represents an i-th secret key share of a secret key sk, msg represents a message, ind represents a message index value, y represents a user post, k represents a table size, $\sigma_o$ represents an initial table state, j represents a table index value, $ctrec_j$ represents the resulting ciphertext table entry, and P represents the following algorithm.

$$P(a, b, c, d) \rightarrow \begin{cases} (c, b) \text{ if } a = c \\ (c, d) \text{ if } a \neq c \end{cases}$$

Thus, for example, where ind==j, P returns (j,msg) and returns (j, 0) where ind≠ j. The element $ctrec_j'$ represents the ciphertext table entry resulting from the operation of P( ). The element σ represents a table state, σ' represents an updated table state, $D_i$ represents an i-th partially decrypted table, $\langle D_I \rangle$ represents a collection of partially decrypted tables that satisfies an access structure, and D represents a decrypted table. The anonymous message board may include the decrypted table D.

A light client construction may facilitate a user employing a public key encryption (PKE) encryption (PKE.Enc) function rather than a TFHE.Enc function. In some configurations, a light client construction of the anonymous message board scheme may include the following functions.

AMB.KeyGen(λ,n,A):

TFHE.KeyGen(λ,n,A)→(tpk, $\langle tsk_i \rangle_{i=1}^n$)

PKE.KeyGen(λ)→(ppk,psk)

TFHE.Enc(tpk,psk)→esk

AMB.Post(pk,msg,ind): PKE.Enc(ppk,(ind,msg))→y

AMB.ServerInit($sk_i$,k): TFHE.Enc(tpk,(j,0)) for j∈[1,k]→$\langle ctrec_j \rangle_{j=1}^k = \sigma_0$ AMB.ServerUpdate($sk_i$,σ):

TFHE.Enc(tpk,y)→ty

TFHE.Eval(tpk,PKE.Dec(·,·),esk,ty)→y'

TFHE.Eval(pk,P,y',$ctrec_j$,esk) for j∈[1,k]→ $\langle ctrec'_j \rangle_{j=1}^k = \sigma'$ AMB.Reveal($sk_i$,σ): TFHE.PartDec($sk_i$,σ)→$D_i$ AMB.Combine(pk, $\langle D_I \rangle$): TFHE.FinalDec(pk,$D'_I$)→D'

Where λ represents a security parameter, A represents an access structure, and n represents a number of participating servers. The element tpk represents a TFHE public key, $tsk_i$ represents an i-th TFHE secret key share of a secret key tsk, ppk represents a PKE public key, and psk represents a PKE secret key. The element esk represents an encrypted secret key. The element pk represents a public key and is set to equal ppk. The element $sk_i$ represents an i-th secret key share of a secret key sk and is set to equal ($tsk_i$, esk). The element msg represents a message, ind represents a message index value, y represents a user post, k represents a table size, $\sigma_0$ represents an initial table state, j represents a table index value, $ctrec_j$ represents the resulting ciphertext table entry. The element ty represents a TFHE encrypted user post, and y' represents an TFHE evaluated user post. The element P represents the following algorithm.

$$P(a, b, c, d) \rightarrow \begin{cases} (c, b) \text{ if } a = c \\ (c, d) \text{ if } a \neq c \end{cases}$$

Thus, for example, where ind==j, P returns (j,msg) and returns (j, 0) where ind≠ j. The element $ctrec_j'$ represents the ciphertext table entry resulting from the operation of P( ). The element σ represents a table state, σ' represents an updated table state, $D_i$ represents an i-th partially decrypted table, $D'_I$ represents a collection of partially decrypted tables that satisfies an access structure, and D' represents a decrypted table. The anonymous message board may include the decrypted table D'. Thus, for example, a user may encrypt data using a standard public key encryption algorithm. Then, for example, the servers may be given an FHE encryption of the secret key corresponding to the public key that the user employed to encrypt the data. With the FHE encryption of the secret key, the servers may homomorphically decrypt the encryption under the plain public key and get an encryption under the FHE public key.

Figure 2:
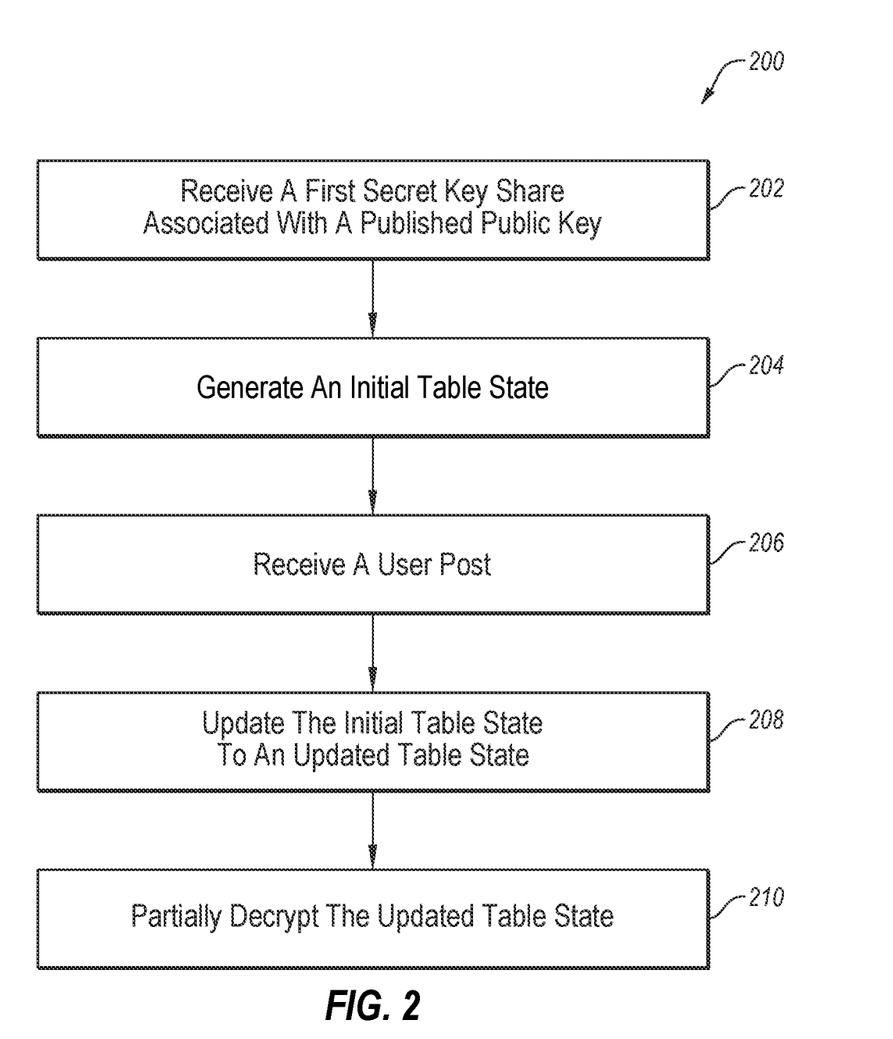
FIG. 2 illustrates a method of facilitating an anonymous message board.

FIG. 2 is a flowchart illustrating a method 200 of facilitating an anonymous message board. In some configurations, the method 200 may be performed by one of n servers, such as then servers 108 of FIGS. 1A-1C, participating in the access structure A. The method 200 may begin at block 202 by receiving a first secret key share associated with a published public key. The first secret key share may be one of a plurality of secret key shares of a secret key that corresponds to the public key. Full decryption of information signed by the public key may be based on a decryption threshold related to a certain number of the secret key shares. In some embodiments, the public key and the first secret key share may be generated according to an access structure and/or a security parameter. By way of example, the public key and the first secret key share may be generated according to the AMB.KeyGen algorithm described herein.

The method 200 may continue to block 204 by generating an initial table state. The initial table state may be generated by encrypting a table index and table initial values via the public key. By way of example, the initial table state may be generated according to the AMB.ServerInit algorithm described herein.

The method 200 may continue to block 206 by receiving a first user post. The first user post may include a first message and a first message index value encrypted via the public key. By way of example, the first message and the first message index value may be encrypted according to the AMB.Post algorithm described herein. In some embodiments, the first message and the first message index value may be encrypted via an TFHE.Enc function described herein. Alternately, the first message and the first message index value may be encrypted via an PKE.Enc function described herein. In some configurations, a plurality of other user posts may be received. The plurality of other user posts may include a plurality of other messages and a corresponding plurality of other message index values encrypted via the public key. The updated table may be repeatedly updated by replacing a plurality of other initial table values with the plurality of other messages. The replaced plurality of other initial table values may be associated with the plurality of other table index values corresponding to the plurality of other message index values.

The method 200 may continue to block 208 by updating the initial table state to an updated table state. The initial table state may be updated to the updated table state by replacing an initial table value of the initial table values with the first message where the replaced initial table value is associated with a table index value corresponding to the message index value. By way of example, the initial table state may be updated to the updated table state according to the AMB.ServerUpdate algorithm described herein.

The method 200 may continue to block 210 by partially decrypting the updated table state via the first secret key share. The updated table state may be partially decrypted in response to a time interval associated with a predetermined length of time expiring after generating the initial table state. The updated table state may be partially decrypted via the first secret key share. By way of example, the updated table state may be partially decrypted according to the AMB.Reveal algorithm described herein. The partially decrypted table may be broadcast.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments.

For example, in some configurations, the method 200 may continue by collecting plurality of partially decrypted tables, including the broadcast first partially decrypted table. In response to the plurality of partially decrypted tables satisfying the decryption threshold, the plurality of partially decrypted tables may be combined based on the public key to obtain a decrypted table. The decrypted table may include a plurality of messages that includes the first message of the first user post. For example, the plurality of messages may be published together as a group of published messages. By way of example, the partially decrypted tables may be combined according to the AMB.Combine algorithm described herein.

Figure 3:
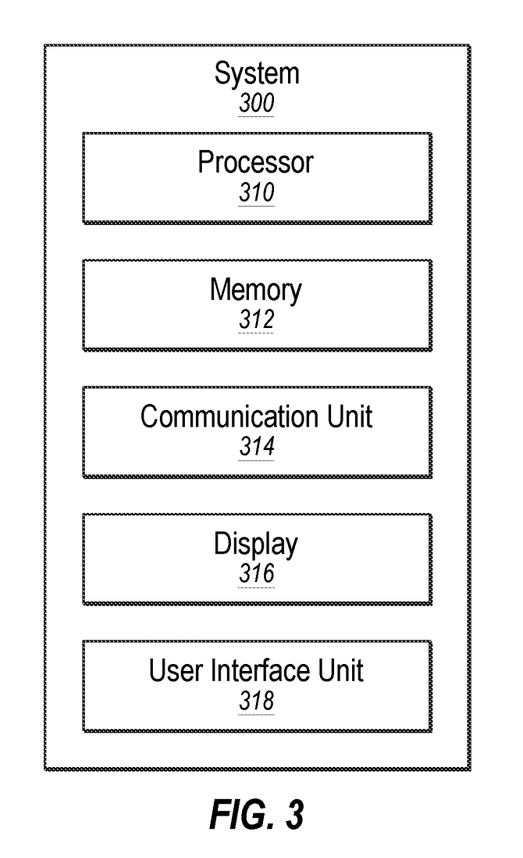
FIG. 3 illustrates an example system that may be used for implementing an anonymous message board.

FIG. 3 is a block diagram illustrating an example system 300 that may be used for implementing an anonymous message board, according to at least one embodiment of the present disclosure. The system 300 may include a processor 310, memory 312, a communication unit 314, a display 316, and a user interface unit 318, which all may be communicatively coupled. In some embodiments, the system 300 may be used to perform one or more of the methods described in this disclosure. For example, the system 300 may describe one or more of the n servers described herein.

For example, the system 300 may be used to perform one or more of the operations in the method 200 of FIG. 2.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may execute the program instructions stored in the memory 312.

For example, in some embodiments, the processor 310 may execute program instructions stored in the memory 312 that are related to task execution such that the system 300 may perform or direct the performance of the operations associated therewith as directed by the instructions. In these and other embodiments, the instructions may be used to perform one or more operations of the method 200 of FIG. 2.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 314 may include any component, device, system, or combination thereof that is configured to transmit or receive information over a network. In some embodiments, the communication unit 314 may communicate with other devices at other locations, the same location, or even other components within the same system. For example, the communication unit 314 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 314 may permit data to be exchanged with a network and/or any other devices or systems described in the present disclosure.

The display 316 may be configured as one or more displays, like an LCD, LED, Braille terminal, or other type of display. The display 316 may be configured to present video, text captions, user interfaces, and other data as directed by the processor 310.

The user interface unit 318 may include any device to allow a user to interface with the system 300. For example, the user interface unit 318 may include a mouse, a track pad, a keyboard, buttons, camera, and/or a touchscreen, among other devices. The user interface unit 318 may receive input from a user and provide the input to the processor 310. In some embodiments, the user interface unit 318 and the display 316 may be combined.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described.

As indicated above, the embodiments described herein may include the use of a special purpose or general-purpose computer (e.g., the processor 310 of FIG. 3) including various computer hardware or software modules, as discussed in greater detail below. Further, as indicated above, embodiments described herein may be implemented using computer-readable media (e.g., the memory 312 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the scope of the present disclosure.

What is claimed is:

1. A method of facilitating an anonymous message board, the method comprising:

receiving a first secret key share associated with a published public key, the first secret key share is of a plurality of secret key shares of a secret key that corresponds to the public key, and wherein full decryption of information signed by the public key is based on a decryption threshold related to a certain number of the secret key shares;

generating an initial table state by encrypting, via the public key, an initial table including a table index and initial table values;

receiving a first user post, the first user post being encrypted via the public key and including a first message and a first message index value, wherein the first user post including the first message and the first message index value encrypted via the public key is encrypted via a threshold fully homomorphic encryption (TFHE) encryption function;

updating the initial table state to an updated table state by replacing an initial table value of the initial table values with the first message, the replaced initial table value associated with a table index value of the table index corresponding to the first message index value; and in response to a time interval associated with a predetermined length of time expiring after generating the initial table state, partially decrypting the updated table state via the first secret key share as a first partially decrypted table and broadcasting the first partially decrypted table.

2. The method of claim 1, further comprising:

collecting a plurality of partially decrypted tables including the first partially decrypted table;

in response to the plurality of partially decrypted tables satisfying the decryption threshold, decrypting the plurality of partially decrypted tables to obtain a decrypted table including a plurality of messages that includes the first message of the first user post; and publishing the plurality of messages together as a group of published messages.

3. The method of claim 1, wherein the public key and the first secret key share are generated according to a security parameter.

4. The method of claim 1, further comprising:

receiving a second user post, the second user post including a second message and a second message index value encrypted via the public key; and updating the updated table state by replacing a second initial table value of the initial table values with the second message, the replaced second initial table value associated with a second table index value of the table index corresponding to the second message index value.

5. The method of claim 1, further comprising:

receiving a plurality of other user posts, the plurality of other user posts including a plurality of other messages and a corresponding plurality of other message index values encrypted via the public key; and repeatedly updating the updated table by replacing a plurality of other initial table values of the initial table values with the plurality of other messages, the replaced plurality of other initial table values associated with a plurality of other table index values of the table index corresponding to the plurality of other message index values.

6. A non-transitory computer-readable medium having encoded therein programing code executable by a processor to perform operations comprising:

receiving a first secret key share associated with a published public key, the first secret key share is of a plurality of secret key shares of a secret key that corresponds to the public key, and wherein full decryption of information signed by the public key is based on a decryption threshold related to a certain number of the secret key shares;

generating an initial table state by encrypting, via the public key, an initial table including a table index and initial table values;

receiving a first user post, the first user post being encrypted via the public key and including a first message and a first message index value;

updating the initial table state to an updated table state by replacing an initial table value of the initial table values with the first message, the replaced initial table value associated with a table index value of the table index corresponding to the first message index value; and in response to a time interval associated with a predetermined length of time expiring after generating the initial table state, partially decrypting the updated table state via the first secret key share as a first partially decrypted table and broadcasting the first partially decrypted table.

7. The non-transitory computer-readable medium of claim 6, the operations further comprising:

collecting a plurality of partially decrypted tables including the first partially decrypted table;

in response to the plurality of partially decrypted tables satisfying the decryption threshold, decrypting the plurality of partially decrypted tables to obtain a decrypted table including a plurality of messages that includes the first message of the first user post; and publishing the plurality of messages together as a group of published messages.

8. The non-transitory computer-readable medium of claim 6, wherein the public key and the first secret key share are generated according to a security parameter.

9. The non-transitory computer-readable medium of claim 6, the operations further comprising:

receiving a second user post, the second user post including a second message and a second message index value encrypted via the public key; and updating the updated table state by replacing a second initial table value of the initial table values with the second message, the replaced second initial table value associated with a second table index value of the table index corresponding to the second message index value.

10. The non-transitory computer-readable medium of claim 6, the operations further comprising:

receiving a plurality of other user posts, the plurality of other user posts including a plurality of other messages and a corresponding plurality of other message index values encrypted via the public key; and repeatedly updating the updated table by replacing a plurality of other initial table values of the initial table values with the plurality of other messages, the replaced plurality of other initial table values associated with a plurality of other table index values of the table index corresponding to the plurality of other message index values.

11. The non-transitory computer-readable medium of claim 6, wherein the first user post including the message and the message index value encrypted via the public key is encrypted via a threshold fully homomorphic encryption (TFHE) encryption function.

12. The non-transitory computer-readable medium of claim 6, wherein the first user post including the first message and the first message index value encrypted via the public key is encrypted via a public key encryption (PKE) encryption function.

13. A system comprising:

one or more processors; and one or more non-transitory computer-readable storage media configured to store instructions that, in response to being executed by the one or more processors, cause the system to perform operations, the operations comprising:

receiving a first secret key share associated with a published public key, the first secret key share is of a plurality of secret key shares of a secret key that corresponds to the public key, and wherein full decryption of information signed by the public key is based on a decryption threshold related to a certain number of the secret key shares;

generating an initial table state by encrypting, via the public key, an initial table including a table index and initial table values;

receiving a first user post, the first user post being encrypted via the public key and including a first message and a first message index value;

updating the initial table state to an updated table state by replacing an initial table value of the initial table values with the first message, the replaced initial table value associated with a table index value of the table index corresponding to the first message index value; and partially decrypting the updated table state via the first secret key share as a first partially decrypted table and broadcasting the first partially decrypted table in response to a time interval associated with a predetermined length of time expiring after generating the initial table state.

14. The system of claim 13, the operations further comprising:

collecting a plurality of partially decrypted tables including the first partially decrypted table;

decrypting the plurality of partially decrypted tables to obtain a decrypted table including a plurality of messages that includes the first message of the first user post in response to the plurality of partially decrypted tables satisfying the decryption threshold; and publishing the plurality of messages together as a group of published messages.

15. The system of claim 13, wherein the public key and the first secret key share are generated according to a security parameter.

16. The system of claim 13, the operations further comprising:

receiving a plurality of other user posts, the plurality of other user posts including a plurality of other messages and a corresponding plurality of other message index values encrypted via the public key; and repeatedly updating the updated table by replacing a plurality of other initial table values of the initial table values with the plurality of other messages, the replaced plurality of other initial table values associated with a plurality of other table index values of the table index corresponding to the plurality of other message index values.

17. The system of claim 13, wherein the first user post including the first message and the first message index value encrypted via the public key is encrypted via a threshold fully homomorphic encryption (TFHE) encryption function.

18. The system of claim 13, wherein the first user post including the first message and the first message index value encrypted via the public key is encrypted via a public key encryption (PKE) encryption function.

* * * * *